(12) United States Patent
Sasaki et al.

(10) Patent No.: US 7,786,631 B2
(45) Date of Patent: Aug. 31, 2010

(54) LINEAR MOTOR

(75) Inventors: Toshihiko Sasaki, Kanagawa (JP);
Kazuo Watanabe, Kanagawa (JP);
Katsumi Ishikawa, Kanagawa (JP)

(73) Assignee: Wako Giken Co., Ltd, Yokohama, Kanagawa (JP)

( * ) Notice: Subject to any disclaimer, the term of this patent is extended or adjusted under 35 U.S.C. 154(b) by 273 days.

(21) Appl. No.: 12/056,984

(22) Filed: Mar. 27, 2008

(65) Prior Publication Data
US 2008/0265690 A1  Oct. 30, 2008

(30) Foreign Application Priority Data

| Apr. 5, 2007 | (JP) | ............................. 2007-121942 |
| Apr. 17, 2007 | (JP) | ............................. 2007-131033 |
| Mar. 11, 2008 | (JP) | ............................. 2008-061140 |

(51) Int. Cl.
*H02K 11/00* (2006.01)
*H02K 23/66* (2006.01)

(52) U.S. Cl. ............... 310/68 B; 310/12.01; 310/12.19; 341/11; 341/15; 341/32; 318/135; 318/153

(58) Field of Classification Search ............ 310/12.01, 310/12.19, 68 B; 341/11, 32; 318/135, 153; *H02K 11/00, H02K 23/66*
See application file for complete search history.

(56) References Cited

U.S. PATENT DOCUMENTS

| 4,451,811 | A | * | 5/1984 | Hoffman | .................... 335/302 |
| 4,983,893 | A | * | 1/1991 | Miyashita et al. | ............ 318/135 |
| 5,091,665 | A | * | 2/1992 | Kelly | ....................... 310/12.19 |
| 5,115,239 | A | * | 5/1992 | Ushiyama | ..................... 341/15 |
| 5,485,468 | A | * | 1/1996 | Kiriyama et al. | .............. 341/13 |
| 5,691,582 | A | * | 11/1997 | Lucas et al. | .................... 310/14 |
| 5,880,541 | A | * | 3/1999 | Hinds et al. | .............. 310/12.19 |
| 7,471,018 | B2 | * | 12/2008 | Nozawa et al. | ........... 310/12.22 |
| 2005/0280316 | A1 | * | 12/2005 | Nozawa et al. | ................. 310/12 |
| 2008/0265807 | A1 | * | 10/2008 | Rose | .......................... 318/135 |
| 2009/0146507 | A1 | * | 6/2009 | Teramachi et al. | ............ 310/12 |

FOREIGN PATENT DOCUMENTS

| JP | 2005-525773 | 8/2005 |
| JP | 2005-237165 | 9/2005 |
| WO | 03/065554 | 8/2003 |
| WO | WO 2006106697 A1 * | 10/2006 |

* cited by examiner

*Primary Examiner*—Quyen Leung
*Assistant Examiner*—John K Kim
(74) *Attorney, Agent, or Firm*—Banner & Witcoff, Ltd

(57) ABSTRACT

A position-data converter and a motor-drive control device are connected. The position-data converter receives two-phase, sine-wave analog signals da and db from two first magnetic detectors, respectively, and converts these signals da and db to position data. On receiving a positioning instruction, the motor-drive control device calculates the value of current, from the current position signal generated by the position-data converter. The permanent magnets incorporated in a linear motor are used as components of a linear scale, as well.

20 Claims, 13 Drawing Sheets

LINEAR MOTOR

CROSS-REFERENCE TO RELATED APPLICATIONS

This application is based upon and claims the benefit of priority from the prior Japan Patent Applications No. 2007-121942 filed on Apr. 5, 2007 No. 2007-131033 filed on Apr. 17, 2007 and No. 2008-061140 filed on Mar. 11, 2008, the entire contents of which are incorporated herein by reference.

BACKGROUND OF THE INVENTION

1. Field of the Invention

The present invention relates to a linear motor, and more particularly to an improved linear motor that undergoes straight-line translation motion and is therefore useful as high-speed repeated positioning means.

2. Description of the Related Art

In the field of transfer apparatuses, linear motors have hitherto been used as drive sources in constant-speed positioning or high-speed positioning. Any linear motor comprises a stator and a movable member. The stator is composed of a hollow cylindrical member and a plurality of magnets arranged in row in the hollow cylindrical member. The movable member is arranged in the stator, facing the outer surface thereof. A technique of arranging all magnets at intervals K, thus not only reducing the cost and the weight, but also decreasing the velocity ripple, has been proposed (see, for example, Jpn. Pat. Appln. Laid-Open Publication No. 2005-237165).

Another technique concerting linear motors has been proposed (see, for example, PCT National Publication No. 2005-525773). In this technique, material having a relative magnetic permeability larger than 2.0 is selected for the hollow cylindrical member (sleeve) containing the row of magnets, thereby increasing the thrust and wear resistance of the linear motor.

If the linear motor is used as drive source in transfer apparatuses, particularly high-speed transfer apparatuses, it is demanded that the motor thrust be increased as much as possible in order to shorten the transfer time.

In view of this, interval K at which the magnets are arranged as proposed in Publication No. 2005-237165 has been studied. The publication teaches that interval K should preferably be about 10% or less of the axial length L of the magnets, to attain a speed and thrust, both well comparable with those attained if any adjacent magnets are set in contact. The publication also describes that if interval K is about 30% or less of the axial length L of the magnets, the resulting motor thrust will be large enough, though the speed is somewhat low.

However, the control of interval K of the magnets can reduce the speed ripple, but is not proposed for increasing the thrust.

Generally, the higher the relative magnetic permeability of any material, the more readily the material will be corroded. Hence, the higher the relative magnetic permeability the hollow cylindrical member of the linear motor disclosed in PCT National Publication No. 2005-525773 has, the shorter the lifetime of the motor will be, and the shorter the lifetime of the transfer apparatus if the transfer apparatus is used outdoors and therefore likely contacts water. Consequently, the transfer apparatus will be degraded in reliability.

BRIEF SUMMARY OF THE INVENTION

It is an object of the present invention to provide a linear motor adaptive to various use environments, in which the effective magnetic flux density interlinking with the armature coil is increased, thereby enhancing the motor thrust.

In an aspect of the present invention, a linear motor is provided, which includes: a field yoke composed of a hollow cylindrical member and a plurality of permanent magnets arranged in the hollow cylindrical member, in a straight row, each with either pole facing and contacting the same pole of either adjacent permanent magnet; an armature having an armature coil arranged, facing the row of magnets and spaced by a magnetic gap from the row of magnets; magnetic characteristic-fluctuating parts arranged at ends of the row of magnets or at the middle thereof and configured to abruptly change magnetic characteristic of the row of magnets; and a magnetic linear encoder using the row of magnets as magnetic scale unit, utilizing a distance between any two adjacent permanent magnets as scale pitch of the magnetic scale, and having a plurality of first magnetic detectors and a second magnetic detector, which are arranged in a lengthwise direction of the armature, the first magnetic detectors being so arranged to have a phase difference of 90° (corresponds to ¼wavelength of the scale pitch) in terms of electrical degree with respect to each other, and the second magnetic detector being so arranged to have a phase difference of 180° (corresponds to ½ wavelength of the scale pitch) in terms of electrical degree with respect to the first magnetic detectors. One component selected form the group consisting of the field yoke and the armature is provided at the stator, and the other component is provided as a movable member, the magnetic linear encoder has a scale head provided at the armature, and the field yoke and the armature move straight relative to each other.

DETAILED DESCRIPTION OF THE INVENTION

Figure 1:
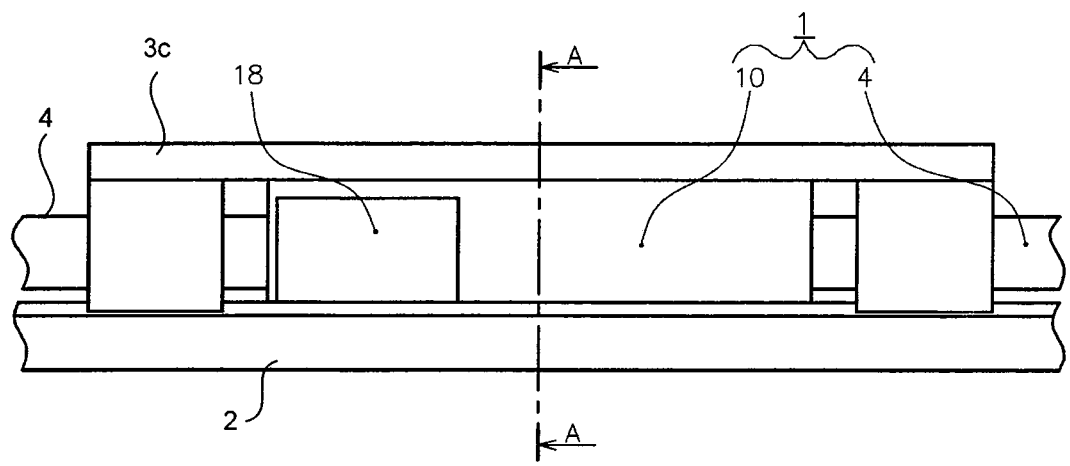
FIG. 1 is a front view outlining the configuration of a linear motor according to a first embodiment of the present invention.

Throughout this description, the embodiments and examples shown should be considered as exemplars, rather than limitations on the apparatus and methods of the present invention.

Embodiments of the present invention will be described with reference to the accompanying drawings. In each figure, the components identical to those shown in any other figure are designated by the same reference numerals. Any component that has once been described will not be explained again. In any linear motor according to this invention, the field yoke or the armature is secured to the stator, while the other is used as movable member. Thus, the field yoke and the armature are moved relative to each other in a straight line. In the embodiments that will be described below, the field yoke is fixed to the stator and the armature is used as movable member, for the convenience of explanation. The present invention is not limited to these embodiments, nonetheless.

FIRST EMBODIMENT

Figure 2:
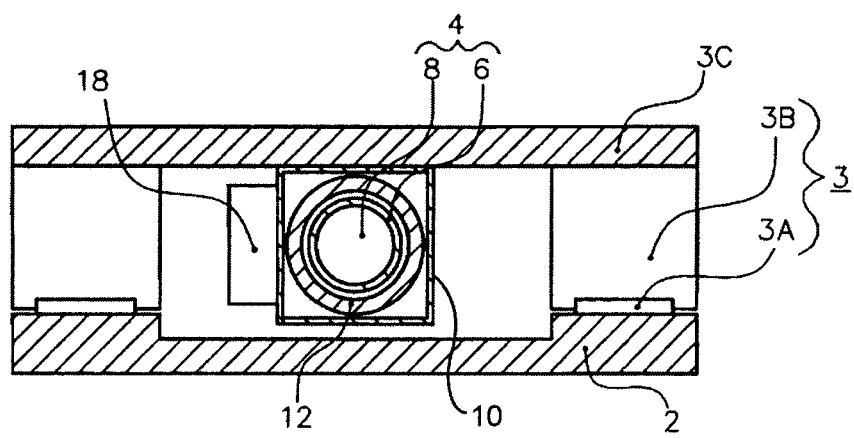
FIG. 2 is a sectional view taken along line A-A shown in FIG. 1.

FIG. 1 is a front view outlining the configuration of a linear motor 1 according to a first embodiment of this invention, which employs a magnetic linear encoder. FIG. 2 is a sectional view taken along line A-A shown in FIG. 1.

As shown in FIGS. 1 and 2, the linear motor 1 comprises a base unit 2 and a linear guide 3. The linear guide 3 is designed to define a straight line in which the linear motor 1 can move. The guide 3 is composed of a guide rail 3A and a slider 3B. The guide rail 3A is secured to the base unit 2. The slider 3B can slide on the guide rail 3A. On the upper surface of the slider 3B, a table 3C is mounted to hold a machine or an apparatus that uses the linear motor 1.

A field yoke 4 is arranged on the base unit 2. The field yoke 4 constitutes the stator (fixed unit) of the linear motor 1. The yoke 4 is configured to generate a magnetic field. The yoke 4 is composed of a hollow cylindrical member (sleeve) 6 and a row of permanent magnets 8 shaped like a column and contacting one another at end. The magnets 8 are inserted in the hollow cylindrical member 6 and have the same shape and the same size. The permanent magnets 8 are magnetized in the lengthwise direction of the hollow cylindrical member 6. The row of permanent magnets arranged in mutual contact, each having either pole contacting the same pole of either adjacent magnet 8. (Thus, the N poles of any two adjacent magnets 8 abut on each other, and so do the S poles thereof.) The longest distance that the linear motor 1 can move, or maximum motion distance, is the difference between the length of the permanent-magnet row and the length of the movable member.

Figure 8:
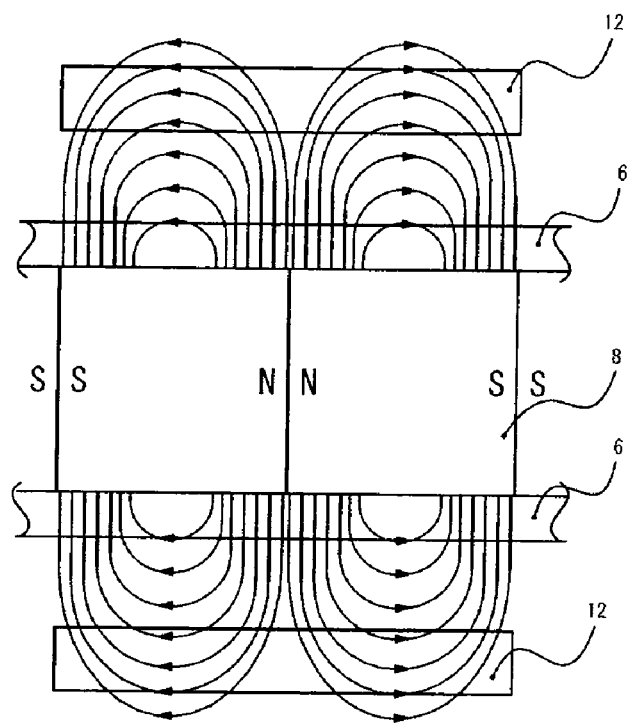
FIG. 8 is a diagram representing the simulation result of synthesizing the magnetic fields emanating from the magnets set in contact, each with either pole facing and contacting the same pole of either adjacent magnet.

Preferably, the magnets 8 should be neodymium-based ones. The permanent magnets 8 are not limited to columnar ones, namely solid ones. Instead, they may be shaped like, for example, a hollow cylinder. Since the permanent magnets 8 are arranged in mutual contact, each with either pole contacting the same pole of either adjacent magnet 8, an extremely large repulsion develops between any two adjacent magnets at all times. Any two adjacent magnets 8 exhibit such simulated magnetic characteristic as shown in FIG. 8. FIG. 8 represents the spatial distribution characteristics of the synthesized magnetic field of the adjacent magnets 8. In FIG. 8, the horizontal axis represents the distance in the axial direction of the hollow cylindrical member 6, while the vertical axis represents the synthesized magnetic field generated by two magnets 8, each having a pole abuts on the same pole of the other. The components of the magnetic flux, which extend in the radial direction of the hollow cylindrical member 6 and pass through the surface of the hollow cylindrical member 6 in vertical direction, constitute a magnetic flux effectively acting on the armature coil 12, which surrounds the magnets 8, with some gap between it and the magnets 8. In the linear motor 1 according to this embodiment, however, the magnetic fluxes emanating from the abutting poles of any two magnets 8 collide with each other. Hence, the magnetic flux emanating one magnet and located near the center of the magnet is more influenced by the magnetic field of the other magnet in all directions, than the magnetic flux located at the outer circumferential surface of the magnet. Therefore, the magnetic flux near the center of the magnet 8 is bent away from the other magnet, because of the repulsion acting between the two magnets. As a result, only the magnetic flux thus bent passes through the surface of the hollow cylindrical member off the radial of the hollow cylindrical member 6. As can be inferred from this, the effective magnetic flux, which acts on the armature coil 12, decreases.

The hollow cylindrical member 6 is made of nonmagnetic material. Preferably, it has relative magnetic permeability of 2.0 or less. If the hollow cylindrical member 6 is made of magnetic material, almost all magnetic fluxes will pass through the magnetic circuit composed of the row of permanent magnets 8, hollow cylindrical member 6 and permanent magnets 8, and only a few effective magnetic fluxes will reach the armature coil 12.

The linear motor 1 has a movable member (movable unit) 10 that has an insertion hole, in which the hollow cylindrical member 6 is loosely inserted. Thus, the movable member 10 can move in the lengthwise direction of the hollow cylindrical member 6. The movable member 10 comprises an armature, housing, and a magnetic linear encoder (linear sensor). The housing holds the armature. The magnetic linear encoder is attached to the housing. The armature coil 12, which is a three-phase coil, is wound round the armature.

Figure 3:
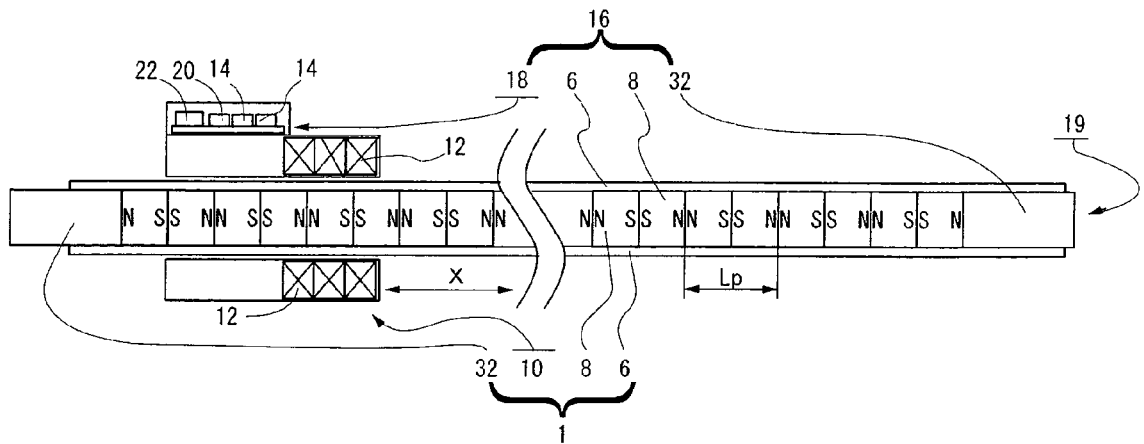
FIG. 3 is a schematic side view of the linear motor according to the first embodiment.
Figure 6:
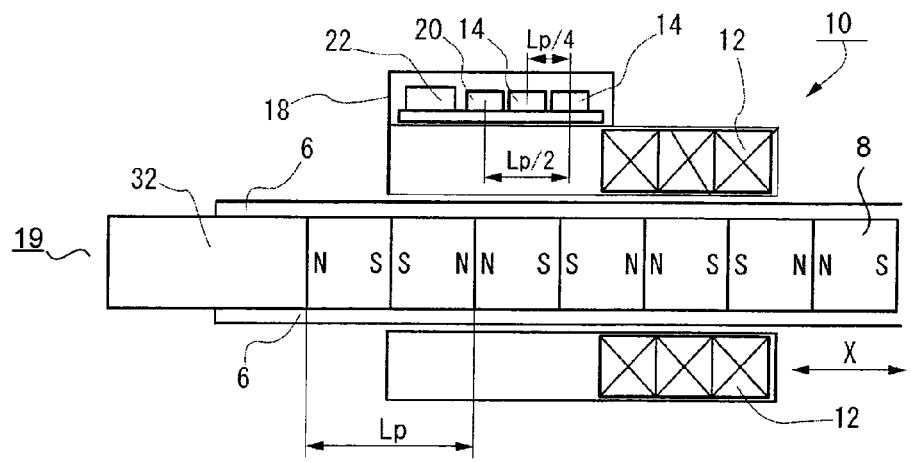
FIG. 6 is a magnified view of a section of the linear motor, which surrounds the motor origin.

FIG. 3 is a schematic magnified view showing a part of the linear motor 1 as viewed from one side. FIG. 6 is a magnified view of one section of the linear motor 1. The magnetic linear encoder 16 has a magnetic scale unit 19 and a scale head 18. The magnetic scale unit 19 is designed to provide a magnetic-pole pattern from which the position of the movable member 10 can be detected. The scale head 18 can detect the magnetic-pole pattern provided by the magnetic scale unit 19. As shown in FIG. 3, the magnetic scale unit 19 and the scale head 18 are not spaced apart. The row of permanent magnets 8, which is used as the field yoke 4, can therefore use the magnetic scale unit 19, i.e., the unit that the magnetic linear encoder 16 should detect. Moreover, the movable member 10 is so configured that, as shown in FIGS. 3 and 6, the length Lp of a unit composed of two permanent magnets 8 may define the scale pitch Lp of the magnetic scale unit 19. The permanent magnets 8 may differ in dimensions. In this case, the movable member 10 can be modified to compensate for the dimensional difference between the magnets 8. How to modify the member 10 is not a gist of the present invention and will not be described in detail.

The scale head 18 of the magnetic linear encoder 16 is held on the side of the movable member 10, i.e., at one end of the armature coil 12, which is the origin of the linear motor 1. That the scale head 18 is provided at the origin means that the information representing the position of the linear motor 1 increases as the motor 1 leaves the origin and decreases as the motor 1 approaches the origin, when the linear motor 1 moves from the present position. The scale head 18 may be held at any position other than this, nonetheless. For example, the scale heed 18 may be held, for example, at the center of the movable member 10.

The magnetic linear encoder 16 has two first magnetic detectors 14 in order to detect the magnetic flux emanating from the row of permanent magnets 8 of the stator. The first magnetic detectors 14 are so arranged that they have a phase difference of 90° in terms of electrical degree with respect to each other. Thus, the two magnetic detectors 14 output a two-phase signal. (The phase difference corresponds to ¼ wavelength of scale pitch Lp.) From the two-phase signal, both the electrical degree of the linear motor 1 and the traveling direction of the linear motor 1 can be determined.

More precisely, the first magnetic detectors 14 output analog signals da and db, respectively, which constitute a two-phase sine-wave analog signal. From the two-phase sine-wave analog signal, the information representing the present position of the scale head 18 will derive. Preferably, these first magnetic detectors 14 are Hall elements that can linearly convert magnetism to an electric signal. The magnetic linear encoder 16 further comprises a magnetic characteristic-fluctuating position-detecting unit 22. This unit 22 is provided in the scale head 18, extending in the lengthwise direction of the armature to detect the position where the magnetic characteristic abruptly changes. The magnetic characteristic-fluctuating position-detecting unit 22 is configured to process and discriminate the signals supplied from the first magnetic detectors 14 and the signals supplied from a second magnetic detector 20.

The second magnetic detector 20 is arranged in the scale head 18, spaced from the first magnetic detectors 14 in the moving direction of the linear motor 1, so that its output may have a phase difference of 180° in terms of electrical degree with respect to the output of the first magnetic detectors 14. (This phase difference corresponds to ½ wavelength of scale pitch Lp.) The second magnetic detector 20 outputs a sine-wave analog signal dc. Preferably, the second magnetic detector 20 is, for example, a Hall element that can linearly convert magnetism to an electric signal.

The magnetic characteristic-fluctuating position-detecting unit 22 maybe composed of, for example, an adder circuit (not shown) and a comparator (not shown, either). The adder circuit adds the output signal dc of the second magnetic detector 20 to the output signal da of the first magnetic detector 14, which has a position difference that corresponds to ½ wavelength of scale pitch Lp (see FIG. 6). The comparator determines the position where the magnetic characteristic has abruptly changed, from the sum of the output signal dc of one unit 20 and the output signal da of the first magnetic detector 14.

Figure 4:
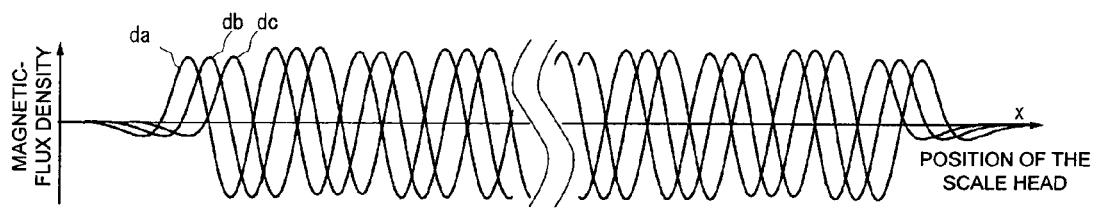
FIG. 4 is a diagram depicting the waveform of an output of the first magnetic detector provided in the first embodiment.
Figure 7A:
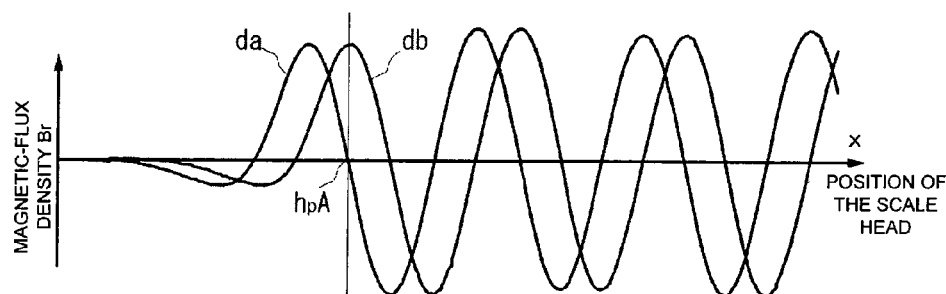
FIG. 7A is a magnified graph depicting a part of the waveform of the output of the first magnetic detector shown in FIG. 6.

The two analog signals da and db output from the two first magnetic detectors 14 and the analog signal dc output from the second magnetic detectors 20 have such waveforms as shown in FIG. 4, which extend along the field yoke 4. In FIG. 4, the vertical axis indicates magnetic flux density Br, whereas the horizontal axis indicates the position of the scale head 18. The magnetic flux density Br plotted on the vertical axis pertains to the magnetic flux emanating from the row of permanent magnets 8 and measured at the position the scale head 18 takes. The waveforms of the analog signals da and db output from the two first magnetic detectors 14 looks as shown in FIG. 7A, if partially magnified.

Figure 10:
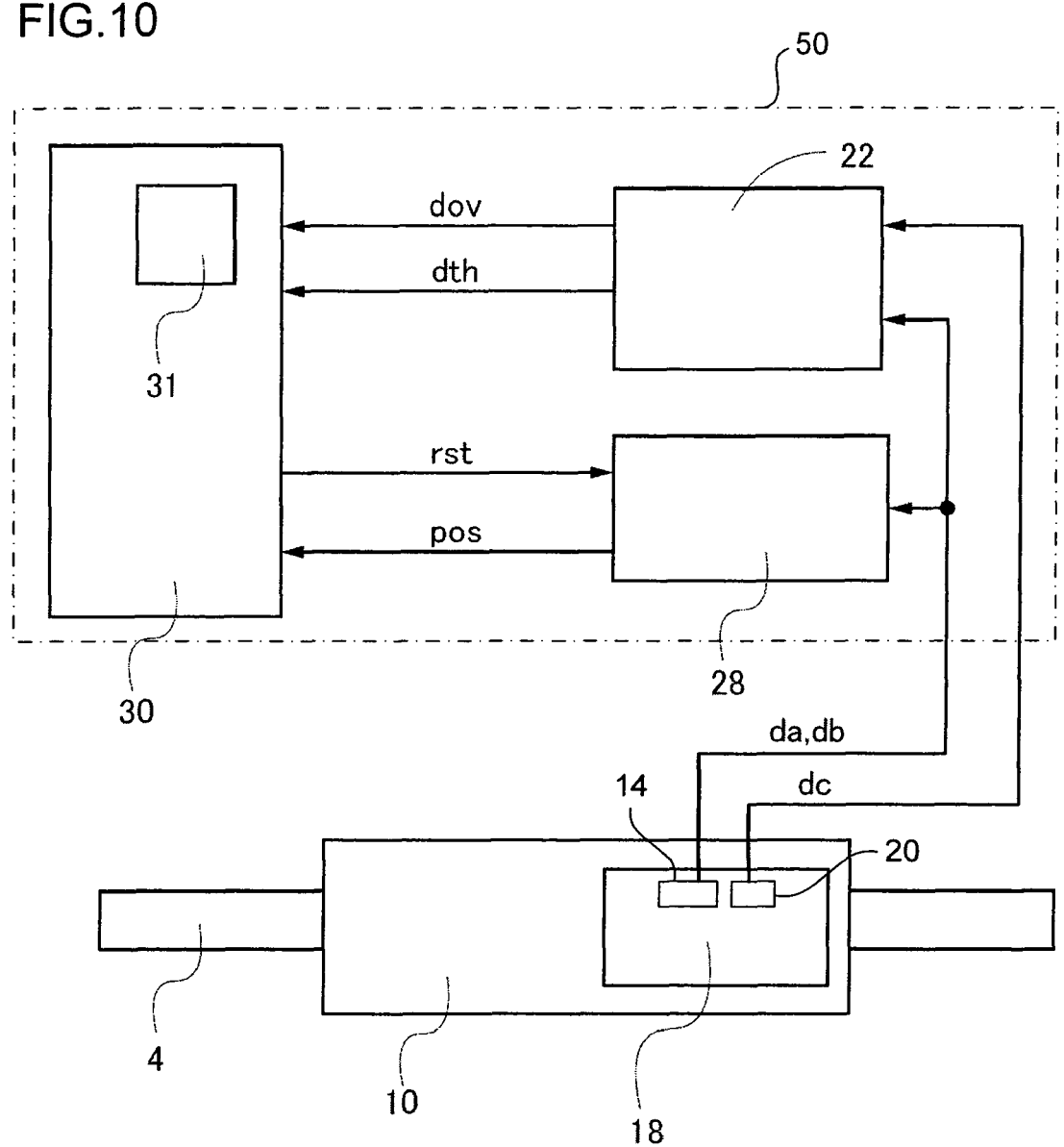
FIG. 10 is a block diagram showing the configuration of a drive system for driving the linear motor according to the first embodiment.

A drive system 50 for driving the linear motor 1, according to the present invention, will be described with reference to FIG. 10, which is a block diagram showing the configuration of the drive system 50. As in FIG. 10 shows, the drive system 50 comprises a motor-drive control device (servo driver) 30, a magnetic characteristic-fluctuating position-detecting unit 22, a position-data converter 28, and a fixed storage unit 31. The fixed storage unit 31 is, for example, a memory into which data can be written. The position-data converter 28 is connected to the motor-drive control device (servo driver) 30. The position-data converter 28 receives a two-phase sine-wave analog signal (da, db) from the first magnetic detector 14 and converts the signal to position data. The motor-drive control device (servo driver) 30 receives a motor-positioning instruction (not shown) from an external device to the linear motor 1 and the current position signal pos generated by the position-data converter 28 and representing the present position of the scale head 18. In response to the motor-positioning instruction, the device 30 generates, from the current position signal pos, a current that should be supplied to the armature coil 12.

The motor-drive control device (servo driver) 30 comprises a central processing unit (or microprocessor), a ROM, a RAM, an input/output circuit, and a power amplifier.

The motor-drive control device 30 controls the current to supply to the armature coil 12, in accordance with a magnetic signal supplied from the first magnetic detector 14, thereby to drive the linear motor 1.

The position-data converter 28 receives an analog signal read from the scale head 18 mounted on the end of the armature coil 12 and representing the present position of the movable member 10, i.e., the two-phase sine-wave analog signal (da, db) from the first magnetic detector 14. The converter 28 converts this signal to position data. The converter 28 functions not only as a position-data converter, but also as a position counter that determines the present position of the scale head 18. The position-data converter 28 receives a reset signal rst the motor-drive control device 30 outputs when the motor 1 returns to the origin. On receiving the reset signal rst, the converter 28 acting as position counter has its count reset to zero.

The motor-drive control device 30 calculates the current to supply to the armature coil 12, from the current position signal pos generated by the scale head 18. The device 30 supplies a control current to the movable member via a current-supplying line (not shown). The target position to which the movable member should move and the speed at which the movable member should move are thereby controlled.

As indicated above, the position-data converter 28 is an independent component of the drive system 50. Nevertheless, the converter 28 may be incorporated in the magnetic linear encoder 16. The magnetic linear encoder 16 may be incorporated in the motor-drive control device 30. Conversely, the motor-drive control device 30 may be incorporated in the magnetic linear encoder 16.

The magnetic characteristic-fluctuating position-detecting unit 22 receives the analog signal da output from the first magnetic detector 14 and the analog signal dc output from the second magnetic detectors 20. The unit 22 then adds these analog signals da and dc.

The analog signal da and the analog signal dc differ in phase by 180°. Therefore, they have the relation of: da≈−dc. Hence, these signals da and dc cancel each other when they are added. At the position where any two adjacent permanent magnets 8 contact, the sum ac of signals ad and dc is almost zero. The sumac is not zero, for two reasons. First, the permanent magnets 8 a little differ from one another in magnetic characteristic and size. Second, the first magnetic detector 14 and second magnetic detectors 20 differ in terms of characteristic.

Figure 5:
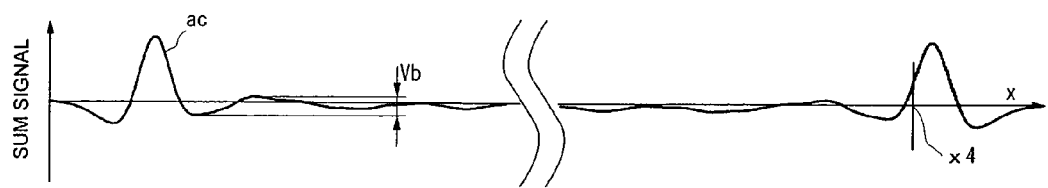
FIG. 5 is a diagram depicting the waveform of an added output of the second magnetic detector provided in the first embodiment.
Figure 7B:
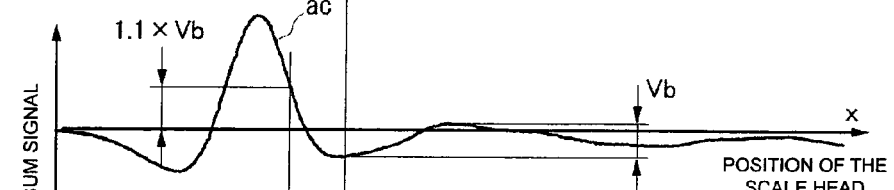
FIG. 7B is a magnified graph illustrating a waveform to which the added output of the second magnetic detector shown in FIG. 6 has been added.

The magnitude of the sum signal ac is processed (for example, compared with a threshold value), thereby detecting a position where the magnetic characteristic has abruptly changed. At such a position, the relation of da ≈−dc no longer holds. Therefore, the value of da+dc is a large output signal. The sum signal ac, i.e., the synthesized sensor output, changes along the overall length of the field yoke 4 as is illustrated in FIG. 5. FIG. 7B is a magnified view of the waveform that the sum signal ac has near the origin. In accordance with the result of the comparison of the sum signal ac with the threshold value, the magnetic characteristic-fluctuating position-detecting unit 22 outputs a magnetic characteristic-fluctuating position-detecting signal dth and an overrun signal dov to the motor-drive control device 30. The threshold value can be set to an appropriate value in accordance with the operating precision that is required of the transfer apparatus using the linear motor.

The magnetic characteristic-fluctuating position-detecting unit 22 may be incorporated in the magnetic linear encoder 16 and may thus be used as a component of the encoder 16. Moreover, since the magnetic linear encoder 16 can be incorporated in the motor-drive control device 30 and can thus be used as a component of the device 30, the magnetic characteristic-fluctuating position-detecting unit 22 may be arranged in the motor-drive control device 30.

As FIG. 3 shows, magnetic characteristic-fluctuating parts 32, which are components that abruptly change the magnetic characteristic of the magnets 8, are closely arranged at the ends of the row of permanent magnets 8 as a part of the field yoke 4, respectively. The magnetic characteristic-fluctuating part 32 provided at the left end of the row is used to detect the position of the origin of the linear motor, while the magnetic characteristic-fluctuating part 32 provided at the right end of the row is used to detect the position of an overrun.

The magnetic characteristic-fluctuating parts 32 can be made of nonmagnetic or magnetic material. It is desired that the parts 32 be made of material having relative magnetic permeability r of 50 or more. Preferably, the parts 32 should be made of material having relative magnetic permeability r of 100 or more. More preferably, it should be made of material having relative magnetic permeability r of 10,000 or more.

As material of the magnetic characteristic-fluctuating parts 32, aluminum alloy, copper alloy and nonmagnetic stainless steel (e.g., SUS304) can be used. More preferable as magnetic materials having a high relative magnetic permeability are magnetic stainless steel, mild steel, silicon iron BFM, carbon steel and low-carbon steel.

The dimension (thickness) the magnetic characteristic-fluctuating parts 32 have in the moving direction of the linear motor 1 can indeed be larger or smaller than the length of the permanent magnet 8 as measured in their magnetizing direction. Nonetheless, the magnetic characteristic-fluctuating parts 32 are preferably thicker than the permanent magnet 8 is long. This is because the magnetic characteristic-fluctuating position-detecting unit 22 needs to reliably detect a position where the magnetic characteristic has abruptly changed. It is desired that the magnetic characteristic-fluctuating parts 32 should have an outside diameter substantially equal to the inside diameter of the hollow cylindrical member 6, so that they may be pushed into the ends of the hollow cylindrical member 6 and caulked to the member 6 after they have been coated with adhesive on the outer circumferential surface.

If the ends of the line of the permanent magnets 8 were not closed with the magnetic characteristic-fluctuating parts 32, the magnetic flux emanating from the permanent magnet 8 provided in either end of the member 6 should immediately return to the opposite pole of the magnet 8. By contrast, if the ends of the line of the permanent magnets 8 with magnetic were closed with magnetic characteristic-fluctuating part 32, the magnetic flux emanating from the permanent magnets 8 provided in either end of the member 6 should pass through the magnetic characteristic-fluctuating parts and return to the opposite pole of the magnet 8. Thanks to the magnetic characteristic-fluctuating parts 32, which close the ends of the hollow cylindrical member 6 and which are made of material having high magnetic permeability, the magnetic flux emanating from either permanent magnet 8 defines a large loop. Note that the magnetic detectors 14 and 20 greatly react to any magnetic flux that intersects at right angles to them.

As seen from FIG. 3 showing the arrangement of the permanent magnets 8 and magnetic characteristic-fluctuating parts 32 and from FIG. 5 showing the waveform of the sum signal ac, an overrun of the movable member 10 can be detected by monitoring the moving direction X based on the moving instruction for the movable member 10 and the sum signal ac. If an overran of the movable member 10 occurs at the left or right end of the row of permanent magnets 8 shown in FIG. 3, the sum signal ac will abruptly increases in magnitude as seen from FIG. 5. The overrun of the movable member 10 can therefore be detected by the magnetic characteristic-fluctuating position-detecting unit 22 when the sum signal ac changes by any value greater than a threshold value. This threshold value can be appropriately set in accordance with the operating precision that is required of the transfer apparatus using the linear motor.

Figure 7C:
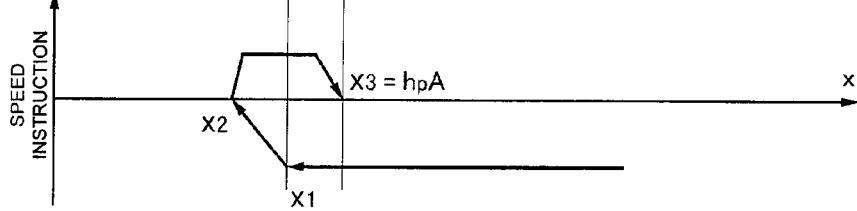
FIG. 7C is a graph explaining when a drive instruction is supplied to the movable member in order to set the origin.

Assume that the magnetic characteristic-fluctuating position-detecting unit 22 detects the right-end position x4 shown in FIG. 5 by comparing the sum signal ac with the threshold value, while the movable member 10 is moving to the right (FIG. 3), in normal operation control. Then, the right-end position x4 can be utilized to detect an overrun of the right end of the movable member 10. Also assume that the position detecting unit 22 detects the origin-setting reference position x1 (hereinafter described) by performing a similar method, while the movable member 10 is moving to the left (FIG. 3), in normal operation control. Then, the origin-setting reference position x1 can be utilized to detect an overrun of the left end of the movable member 10. In any linear motor, it is desired that the position be easily set for the origin. It is therefore advisable to supply a drive instruction to the movable member 10 as shown in FIG. 7C in order to set the origin. The method of setting the origin, illustrated in FIG. 7C, will not be explained, because it is outside the gist of the present invention.

Figure 11:
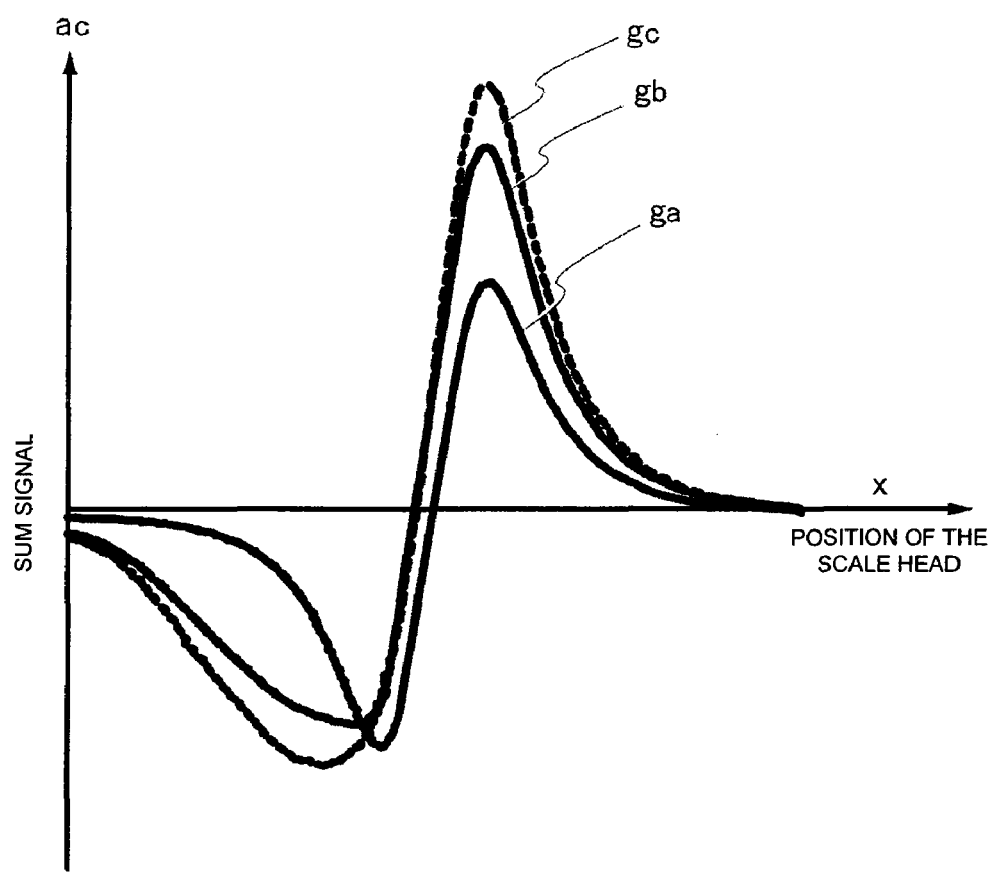
FIG. 11 is a graph depicting the output of a synthesis sensor, which changes with the relative magnetic permeability of the hollow cylindrical member.

In FIG. 11, curve ga indicates the waveform that the analog sum signal ac has if the magnetic characteristic-fluctuating parts 32, which are solid members having a diameter equal to that of the permanent magnets 8, provided in the hollow cylindrical member 6 as shown in FIGS. 3 and 6, are made of nonmagnetic stainless steel SUS304 (relative magnetic permeability: 1.0008). In FIG. 11, the position of the scale head is plotted on the horizontal axis and the magnitude of the sum signal is plotted on the vertical axis.

Figure 13:
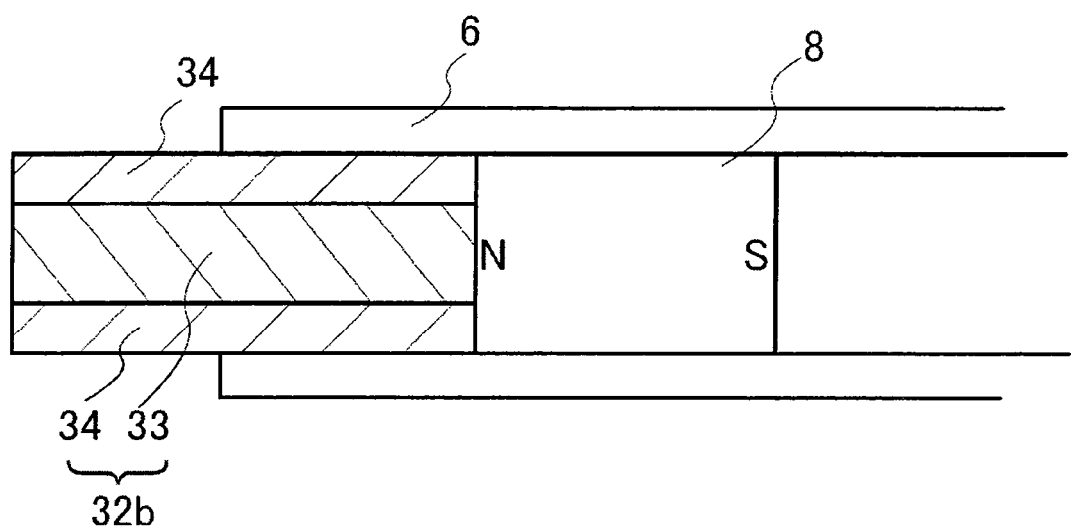
FIG. 13 is a diagram showing another configuration of the magnetic characteristic-fluctuating parts of a linear motor according to the invention, at which the magnetic characteristic fluctuates.

A modification of the magnetic characteristic-fluctuating parts 32 will be will be described. FIG. 13 shows a modified characteristic-fluctuating part 32b. The characteristic-fluctuating part 32b is composed of a high-permeability magnetic core 33 and a tube 34. The core 33 has magnetic permeability r of 10,000 and a diameter that is half the diameter of the permanent magnets 8. The tube 34 is made of nonmagnetic stainless steel (SUS304) and mounted on the core 33. An analog sum signal ac generated by the modified magnetic characteristic-fluctuating parts 32b has such a waveform as indicated by curve gb shown in FIG. 11.

Figure 14:
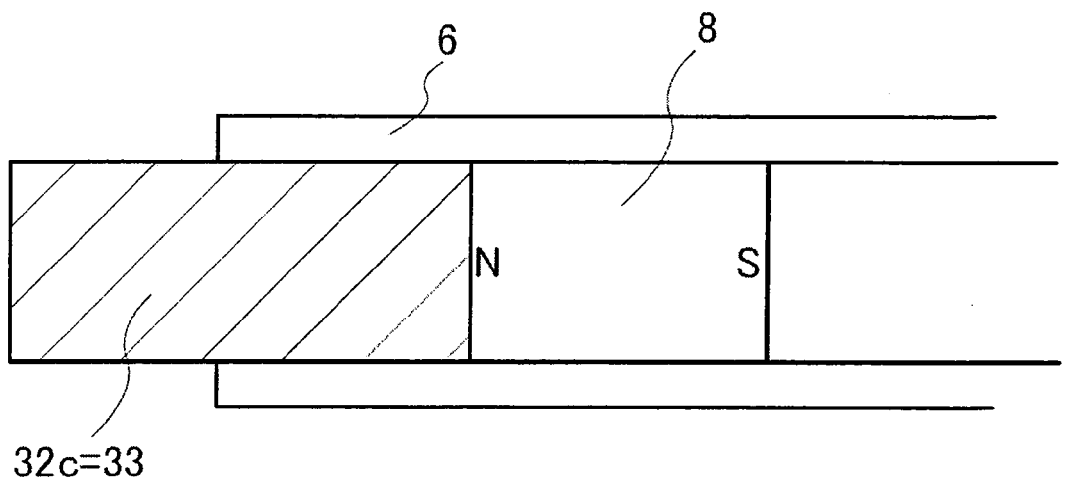
FIG. 14 is a diagram showing still another configuration of that section of a linear motor according to the invention, at which the magnetic characteristic-fluctuating parts.

FIG. 14 shows another modified characteristic-fluctuating part 32c. This characteristic-fluctuating part 32c is a solid member made of a high-permeability magnetic material having relative magnetic permeability r of 10,000. Its diameter is equal to that of the permanent magnets 8. An analog sum signal ac generated by this modified magnetic characteristic-fluctuating parts 32c has such a waveform as indicated by curves gc shown in FIG. 11. As can be understood from curves ga, gb and gc shown in FIG. 11, the magnetic characteristic-fluctuating parts can be made of either nonmagnetic material or magnetic material.

Figure 12:
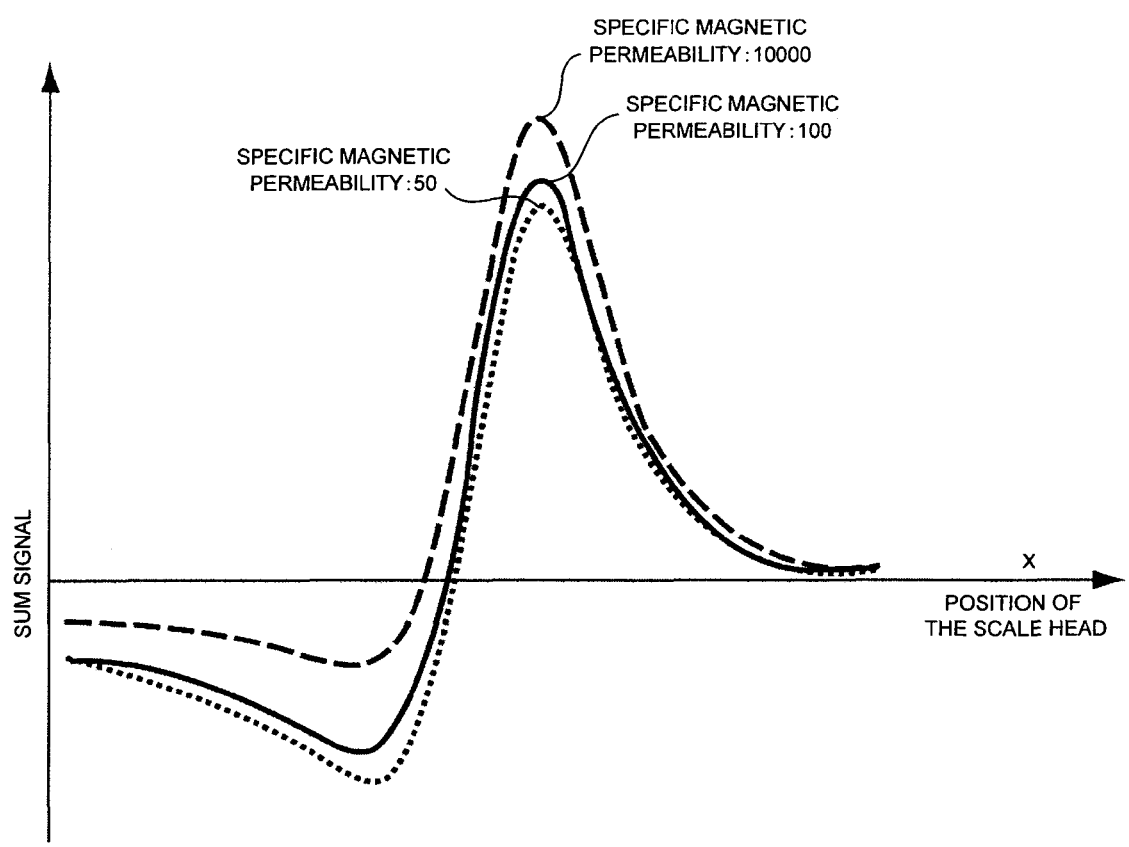
FIG. 12 is a graph representing the results of simulation performed on the output of the synthesis sensor, which changes with the relative magnetic permeability of the hollow cylindrical member.

Taking the foregoing into consideration, the inventors hereof conducted a simulation in order to determine how the magnetic characteristic of the magnetic characteristic-fluctuating parts change if they are made of different materials. The results of the simulation were as shown in FIG. 12. As can be understood from the simulation results shown in FIG. 12, it is advisable to use material that contains magnetic substance having magnetic permeability r of 50 or more, preferably 100 or more, and more preferably 10,000 or more.

The positions the magnetic characteristic-fluctuating parts take are not limited to those specified for the first embodiment described above. They can of course be located at some other various positions. For example, they may be arranged at the middle of the field yoke, not at the ends of the magnet row as described above. Alternatively, they may be arranged not only at the ends of the magnet row, but also at the middle of the field yoke.

In the present embodiment, a plurality of permanent magnets are provided in the hollow cylindrical member having a low relative magnetic permeability, each arranged with either pole contacting the same pole of either adjacent permanent magnet. Thus, the linear motor has, so to speak, a straight magnet bar, and can therefore generate a large thrust. Moreover, the row of permanent magnets (i.e., a component of the linear motor) is used also as the linear scale of the linear encoder. The linear encoder can therefore maintain its detection sensibility unlike an optical encoder that has its sensitivity lowered if dust or dirt sticks to it. This can render the linear motor resistant to environmental changes.

SECOND EMBODIMENT

Figure 15:
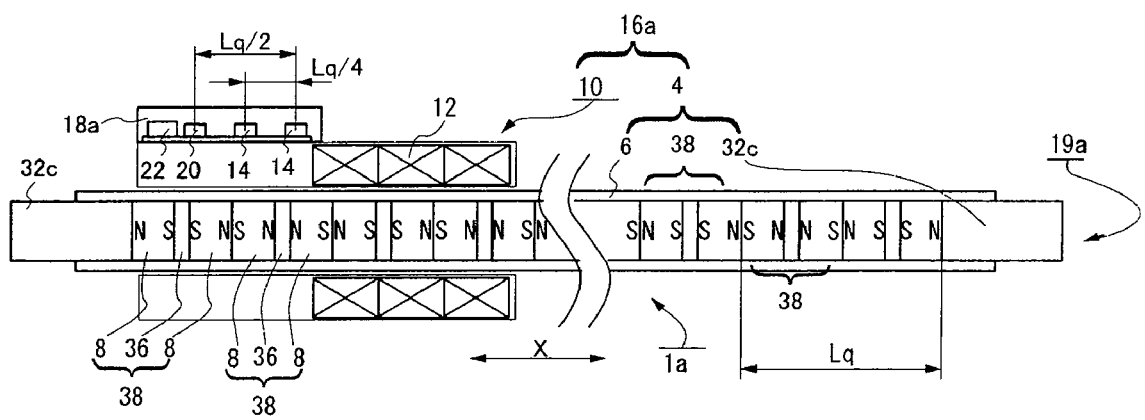
FIG. 15 is a diagram depicting the configuration of a linear motor according to a second embodiment of the present invention.

A second embodiment of the present invention will be described. FIG. 15 depicts a linear motor 1a according to the second embodiment. The linear motor 1a differs in configuration from the linear motor 1 according to the first embodiment, in the following respects.

In the second embodiment, the permanent magnets are so arranged that each may have either pole contacting the same pole of either adjacent permanent magnet (the N poles of any two adjacent magnets abut therefore on each other, and so do the S poles thereof), thereby improving the arrangement and assembling of the permanent magnets and making the effective magnetic flux that extends across the armature coil more intensive than in the linear motor 1 according to the first embodiment. The linear motor according to the second embodiment therefore has an improved thrust.

Generally, the permanent magnets 8 incorporated in a linear motor can generate a very intense magnetic field if they are rare-earth magnets made of a neodymium-based material. If columnar, neodymium-based permanent magnets 8 are arranged in a hollow cylindrical member 6 made of nonmagnetic material, each with either pole facing and contacting the same pole of either adjacent magnet, as shown in FIG. 8, an extremely strong repulsion develops between any two adjacent magnets 8. Consequently, it is very difficult to assemble the linear motor.

Figure 9:
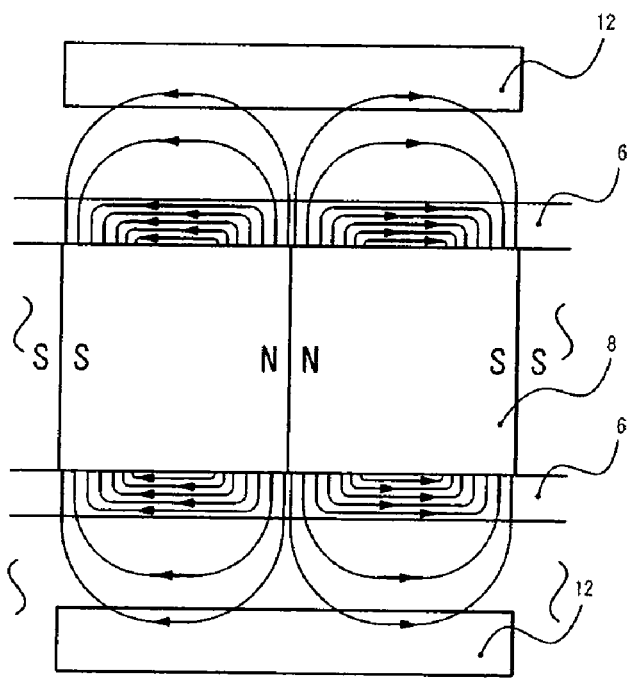
FIG. 9 is a diagram representing the simulation result of synthesizing the magnetic fields emanating from the magnets set in contact, each with either pole facing and contacting the same pole of either adjacent magnet, when the magnets are arranged in a hollow cylindrical member having high magnetic permeability.

The effective magnetic-field component emanating from the permanent magnets, which contributes to the thrust of the linear motor, more passes in the hollow cylindrical member 6 having a low electrical resistance than reaching the armature coil through the gap between the member 6 and the magnets 8, in which the electrical resistance is high. If the magnet row is arranged in the hollow cylindrical member 6 as is illustrated in FIG. 9, the thrust of the linear motor will more decrease in the case where the hollow cylindrical member 6 has a high relative magnetic permeability m than in the case where the member 6 has a low relative magnetic permeability m. Hence, it is desired that the hollow cylindrical member 6 be made of nonmagnetic material having a relative magnetic permeability of 2.0 or less.

As FIG. 15 shows, any two adjacent permanent magnets 8 magnetized in the lengthwise direction of the hollow cylindrical member 6, which are identical in both shape and size, are arranged, each with either pole facing and contacting the same pole of the other magnet 8, and spaced by a spacer 36 interposed between them and having a prescribed thickness, thus constituting one magnet unit 38. The spacer 36 is made of material having a relative magnetic permeability n (where n is 1.5 or more) and may be magnetic members.

A plurality of such magnet units 38 as described above are arranged in series, end to end, in the hollow cylindrical member 6. Of each magnet unit 38 thus arranged in the hollow cylindrical member 6, either magnet 8 has one pole facing and contacting the opposite pole of one magnet 8 of either adjacent magnet unit. Thus, the permanent magnets 8 of the magnet units 38 constitute a field yoke 4.

Preferably, the spacers 36 have thickness larger than the wall thickness of the hollow cylindrical member 6. The relative magnetic permeability n of the spacers 36 should be higher than the relative magnetic permeability m of the hollow cylindrical member 6, by 0.5 or more, preferably by 10 or more, more preferably by 50 or more, and still more preferably by 100 or more. In other words, the higher the permeability n of the spacers 36 than the permeability m of the hollow cylindrical member 6, the more effective the magnetic flux applied from the end of each permanent magnet 8 constituting the magnet units 38 to the armature coil 12 will become, and the more the thrust of the linear motor 1a can increase.

In the linear motor 1a so configured, the magnet units 38 constitute a magnetic scale unit 19a that servers as both field system of the linear motor 1a and the object to be detected by a magnetic linear encoder 16a. As shown in FIG. 15, any two adjacent magnet units 38, one consisting of two permanent magnets 8 having N poles spaced by a spacer 36, and the other consisting of two permanent magnets 8 having S poles spaced by a spacer 36, form a pair of magnet units 38. Each pair of magnet units 38 has length Lq, which defines the unit of the magnetic scale unit 19a. That is, the magnetic scale unit 19a has a scale pitch of Lq As shown in FIG. 15, too, two magnetic characteristic-fluctuating parts 32c, which abruptly changes the magnetic characteristics of the magnet units 38, are arranged at the both ends of the row of permanent magnets 8, respectively. The magnetic characteristic-fluctuating parts 32c are made of magnetic material that has a relative magnetic permeability r of preferably 100 or more, more preferably 10,000 or more. Like their counterparts of the first embodiment, the magnetic characteristic-fluctuating parts 32c are provided in order to detect the origin or an overrun point.

The movable member (movable unit) 10 of the linear motor 1a has a through hole, through which the hollow cylindrical member 6 extends. Hence, the movable member 10 can move in the lengthwise direction of the hollow cylindrical member 6. The movable member 10 comprises an armature, housing, and a magnetic linear encoder 16a (linear sensor). The housing holds the armature. The linear encoder 16a is attached to the housing. The magnetic scale unit 19a of the linear encoder 16a is used as field yoke 4 as well, as in the first embodiment. An armature coil 12, which is a three-phase coil, is wound round the armature.

The linear encoder 16a has a scale head 18a. The scale head 18a is provided near the armature coil 12, extending in the lengthwise direction of the armature (or in the direction of arrow X). The scale head 18a has two first magnetic detectors 14, which are so arranged that they have a phase difference of 90° in terms of electrical degree with respect to each other.

Thus, the two first magnetic detectors 14 output a two-phase signal. (The phase difference corresponds to ¼ wavelength of scale pitch Lq.) Thus, the scale head 18a can detect both the electrical degree of the linear motor 1a and the traveling direction of the linear motor 1a. In addition, a second magnetic detector 20 is arranged in the scale head 18a, spaced from the first magnetic detectors 14, so that its output may have a phase difference of 180° in terms of electrical degree with respect to the output signals of the first magnetic detectors 14. (This phase difference corresponds to ½ wavelength of scale pitch Lq.)

The magnetic linear encoder 16a processes a two-phase analog signals da and db output from two first magnetic detectors 14, respectively, thereby generating a position signal representing the position the scale head 18a takes at present. Further, the scale head 18a incorporates a magnetic characteristic-fluctuating position-detecting unit 22. The position-detecting unit 22 adds the analog signal da output from one first magnetic detector 14 and the analog signal dc output from the second magnetic detector 20, thus generating a sum signal. The sum signal is compared with, for example, a threshold value, thereby detecting a position where the magnetic characteristic has changed.

In comparison with the magnetic linear encoder 16 used in the first embodiment, the magnetic linear encoder 16a differs only in that the linear scale of the linear encoder has a pitch Lq, not pitch Lp as in the first embodiment. The magnetic linear encoder 16a operates exactly in the same way as its counterpart of the first embodiment.

The permanent magnets are arranged in the linear motor 1a according to this embodiment, in a more complicated manner than in the first embodiment. The distribution of the magnetic field (i.e., magnetic profile) in the space through which the armature coil moves inevitably changes in a way more complex than in the first embodiment. Hence, the linear motor 1a must be controlled so minutely that it may be fast accelerated and decelerated, with its vibration being suppressed. To this end, it is desirable to scan the magnetic scale unit 19a from its left end to its right end, thus preparing the magnetic profile of the magnet units 38 of the linear motor 1a, and to store the data representing the magnetic profile in the battery-driven RAM or a rewritable fixed storage unit 31, either provided in the motor-drive control device 30.

Figure 16:
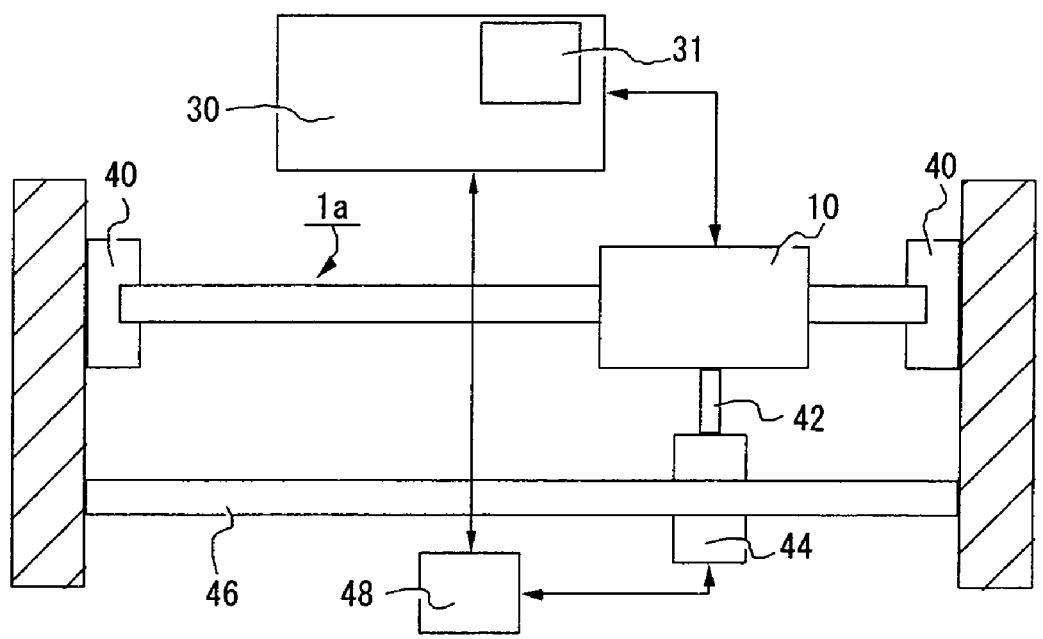
FIG. 16 is a diagram showing the configuration of a system for preparing a magnetic profile.

A method of preparing the magnetic profile of the magnet units 38 will be explained. FIG. 16 is a diagram schematically showing the configuration of a system for preparing the magnetic profile. After the linear motor 1a has been assembled, an absolute-position measuring device 44-46, such as a laser distance finder or a high-precision magnetic linear scale, is arranged in parallel to the linear motor 1a. The component of the device 44-46 is coupled to the movable member 10 by using a coupler 42. A control apparatus 48, such as a personal computer, is used, measuring the magnetic-flux density at prescribed intervals, from the left end to right end of the linear motor 1a. The magnetic-flux densities thus measured are associated with the absolute positions where they have been measured, thus providing magnetic profile data. This data is compressed by an appropriate method. For example, the magnetic profile data may be subjected to Fourier transform, and only the coefficients obtained through the transform are stored in a memory. The magnetic profile data, thus compressed, is transferred from the control apparatus 48 to the motor-drive control device 30. In the control device 30, the data is stored in a rewritable ROM or the like. As shown in FIG. 16, the field yoke can be fixed in place with a clamp 40.

Figure 17:
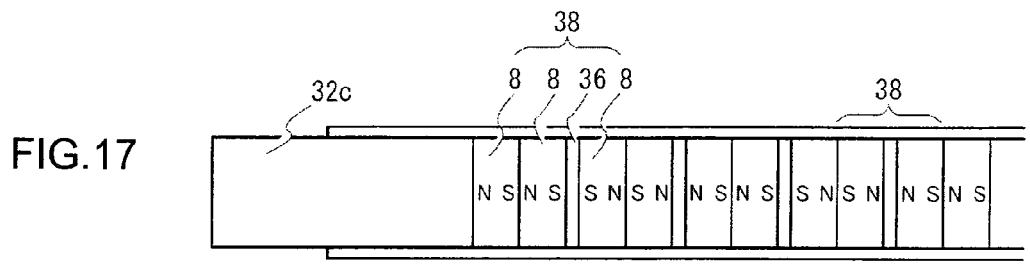
FIG. 17 is a diagram showing another end-configuration that the row of permanent magnets may have.
Figure 18:
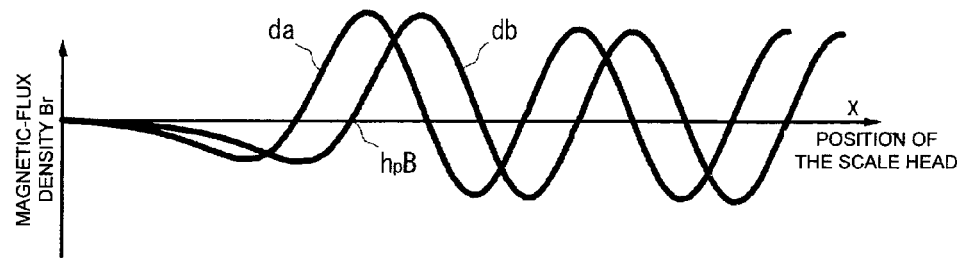
FIG. 18 is a graph illustrating the waveform of an output of the magnetic detector shown in FIG. 17.
Figure 19:
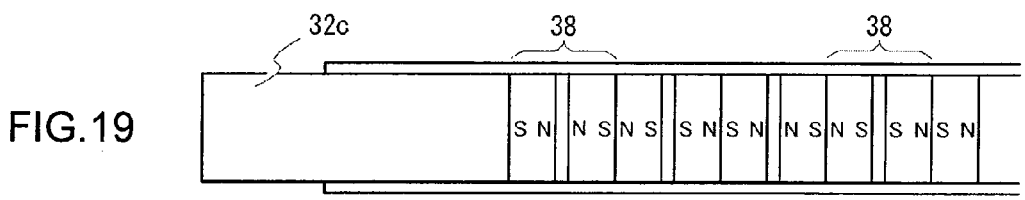
FIG. 19 is a diagram depicting still another end-configuration that the row of permanent magnets may have.
Figure 20:
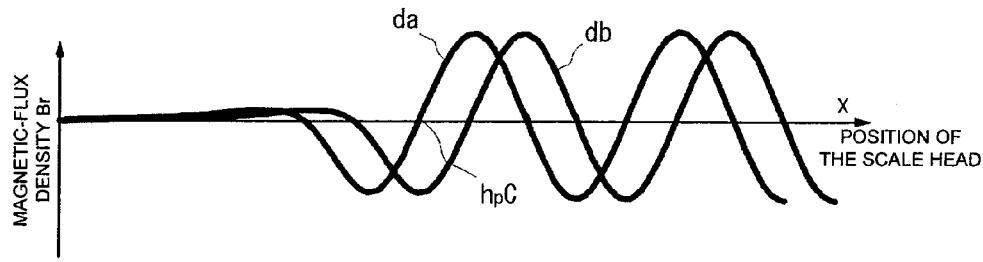
FIG. 20 is a graph illustrating the waveform of an output of the magnetic detector shown in FIG. 19.
Figure 21:
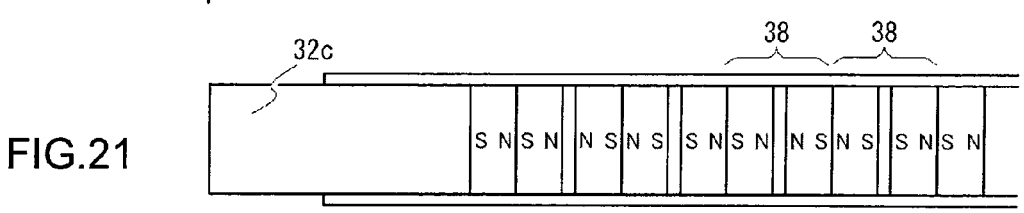
FIG. 21 is a diagram showing another end-configuration that the row of permanent magnets may have.
Figure 22:
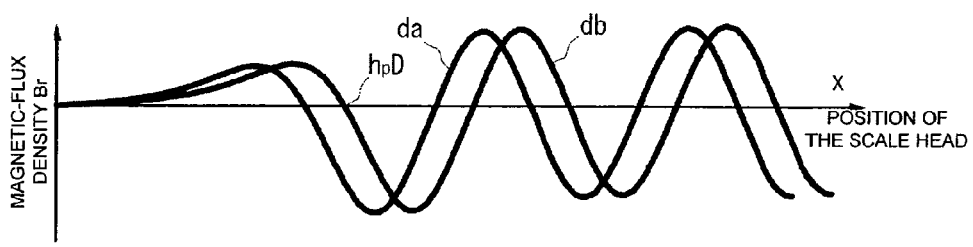
FIG. 22 is a graph illustrating the waveform of an output of the magnetic detector shown in FIG. 21.

The magnet row comprising magnet units 38 of two types, which mutually contact, end to end, may have modified end parts. The left end part shown in FIG. 15 can have, as its origin, the zero-crossing point hpA of, for example, an A-phase analog signal, just as in the case shown in FIG. 7A. A permanent magnet 8 may be provided on the left end of the leftmost magnet unit 38 shown in FIG. 17, with its S pole of the permanent magnet 8 contacting this leftmost magnet unit 38. In this case, as shown in FIG. 18, the magnetic linear encoder 16a and the magnetic characteristic-fluctuating parts 32c can detect, as origin, the zero-crossing point hpB of, for example, a B-phase analog signal. Further, if the left end of the leftmost magnet unit 38 may be an S pole of the permanent magnet 8 as shown in FIG. 19, the magnetic linear encoder 16a and the magnetic characteristic-fluctuating parts 32c can detect, as origin, the zero-crossing point hpC of, for example, an A-phase analog signal as is illustrated in FIG. 20. Still further, a permanent magnet 8 may be provided on the left end of the leftmost magnet unit 38 shown in FIG. 21, with its N pole of the permanent magnet 8 contacting this leftmost magnet unit 38. If this is the case, as shown in FIG. 22, the magnetic linear encoder 16a and the magnetic characteristic-fluctuating parts 32c can detect, as origin, the zero-crossing point hpD of, for example, a B-phase analog signal. In each of these cases, the threshold value can be easily fixed or set because the zero-crossing point assumes the same position, regardless of the intensities of the magnetic fluxes emanating from the magnets. Of countless zero-crossing points that exist, points hpA to hpD are utilized, because the magnetic fluxes are stable near these points hpA to hpD, ultimately stabilizing the thrust of the linear motor.

Figure 23:
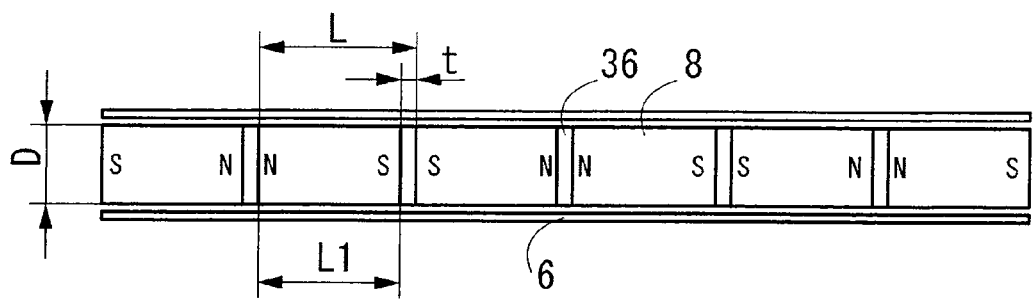
FIG. 23 is a diagram explaining the relation the permanent magnets and the spacers have in terms of shape and size.

The inventors hereof studied how the relation that the permanent magnets 8 constituting the magnet units 38 have with the spacers 36 in terms of size and shape influences the distribution of magnetic field in the space around the row of permanent magnets. Assume that, as shown in FIG. 23, each permanent magnet 8 has length L1 in the direction of magnetization and an outside diameter D, and each spacer 36 has length t in the axial direction. Thus, a unit composed of a permanent magnet 8 and a spacer 36 has length L, which is the sum of L1 and t.

Figure 24:
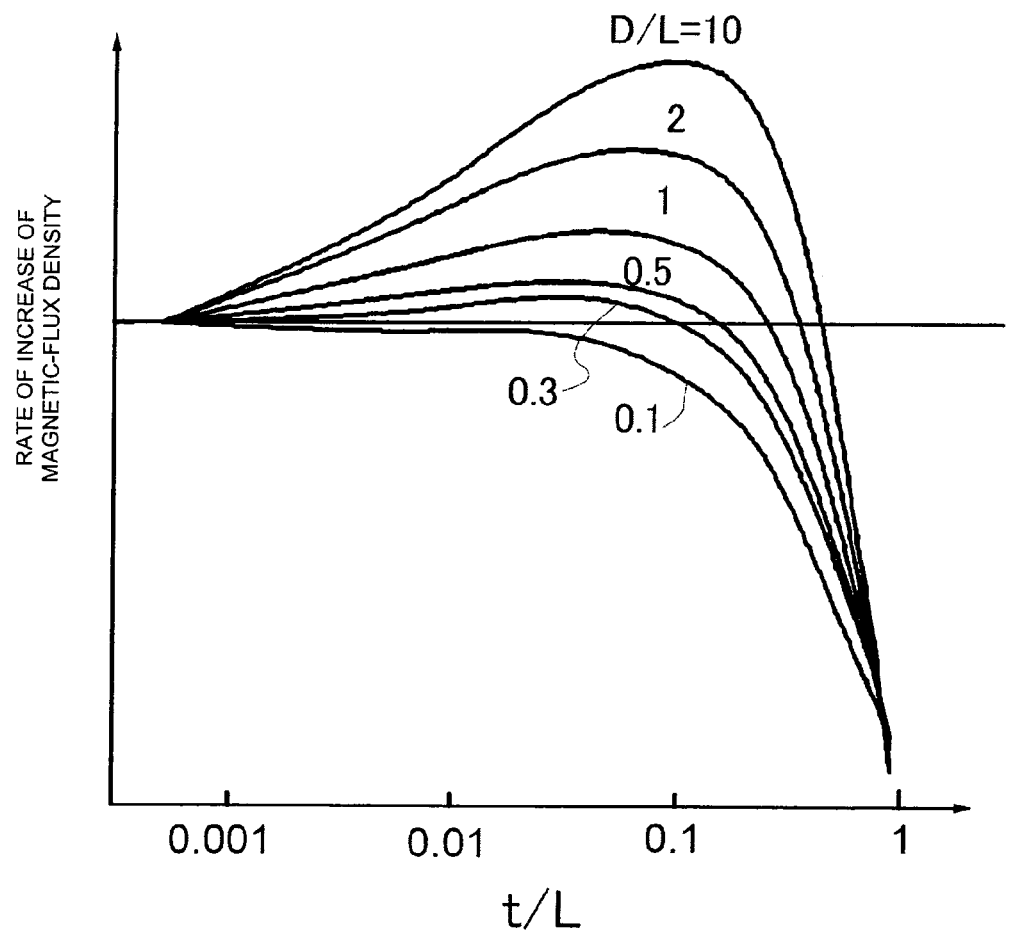
FIG. 24 is a graph showing how the magnetic flux density changes with ratio of D (FIG. 23) to L (FIG. 23)

First, the inventors observed how the distribution of magnetic field changed in the space around the row of permanent magnets, obtaining such a characteristic diagram as shown in FIG. 24. In FIG. 24, the ratio of spacer length t to the total length L of each magnet 8, i.e., t/L, is plotted on the horizontal axis and normalized. As the radio of the outside diameter D of each magnet 8 to the length L, i.e., D/L, was changed, the rate at which the magnetic-flux density increased was measured as plotted on the vertical axis in FIG. 24, assuming that the spacers 36 had relative magnetic permeability of 100. As can be understood from FIG. 24, the magnetic field around the permanent magnets 8 can be effectively intensified because the spacers 36 are interposed between the permanent magnets 8, if the spacers 36 have an appropriate shape.

As seen from FIG. 24, no increase in magnetic-flux density can be observed in the magnetic field around the permanent magnets 8 if the spacers 36 have a relative magnetic permeability of about 100 and if ratio D/L is 0.1. If ratio D/L is 0.3 or more, the magnetic-flux density can increase in the magnetic field around the permanent magnets 8, if the magnets 8 have an appropriate shape and the spacers 36 have an appropriate length t. If radio D/L is 1 or more, the magnetic-flux density can particularly increase in the magnetic field around the permanent magnets 8. If the spacers 36 are made of material having a higher relative magnetic permeability, the magnetic-flux density can increase in the magnetic field around the permanent magnets 8 even if radio D/L is relatively small.

With regard to the length (thickness) t of the spacers 36, radio t/L, where L is L1+t, the magnetic-flux density can increase in the magnetic field around the permanent magnets 8 if ratio t/L is ranges from about 0.005 to 0.3, as can be understood from the value plotted on the horizontal axis of FIG. 24. As seen from FIG. 24, too, the range of 0.01 to 0.2 is more preferable for ratio t/L.

Figure 25:
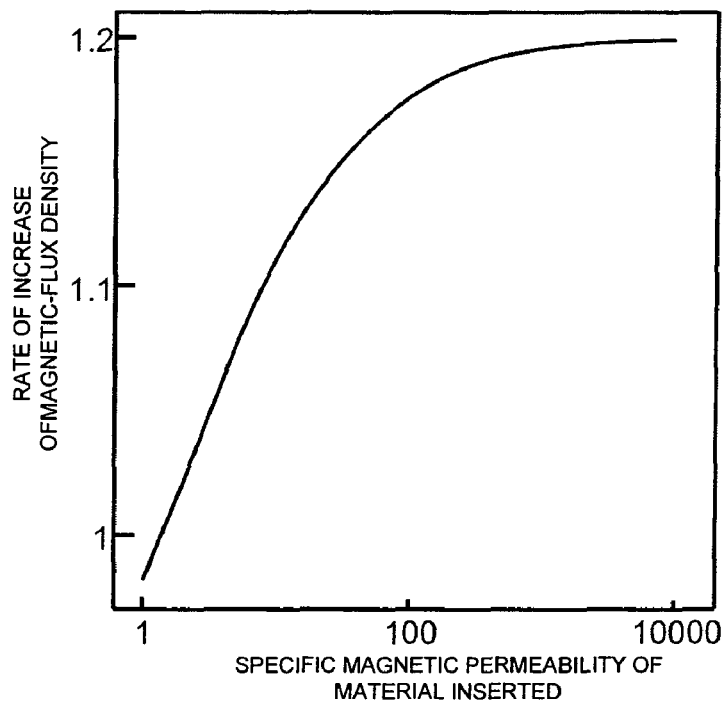
FIG. 25 is a graph representing a relation between the relative magnetic permeability and the rate of increase of the magnetic-flux density.
Figure 26:
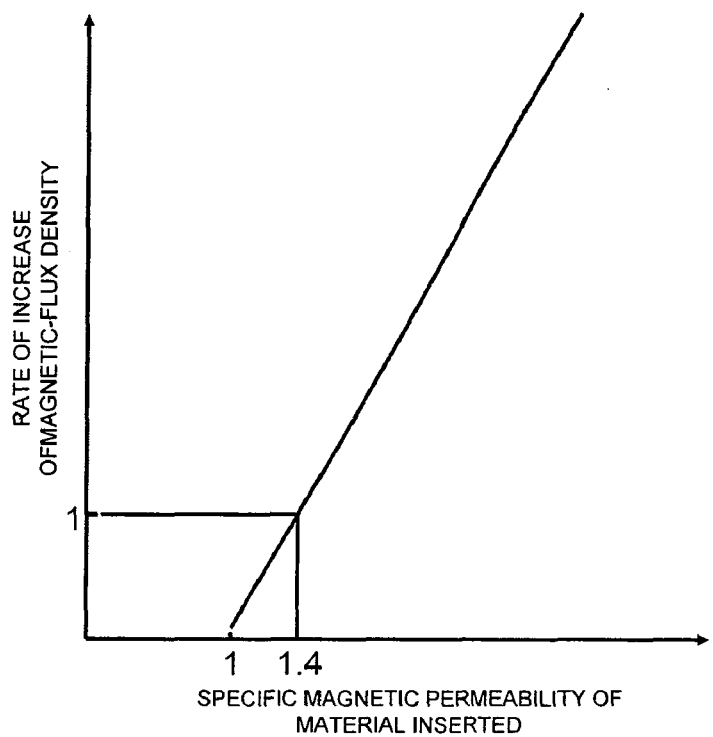
FIG. 26 is a graph representing another relation between the relative magnetic permeability and the rate of increase of the magnetic-flux density.

The invertors hereof conducted a simulation in order to determine the magnetic-flux density at a position (i.e., center of the armature coil 12), which lies 3 mm from the outer circumferential surface of each permanent magnet 8 in the radial direction thereof (or at the axis of the armature coil 12). In this simulation, ratio D/L (i.e., ratio of the outside diameter D to the sum length L) and ratio t/L (i.e., ratio of the spacer length t to the sum length L) were set, as shaped parameters, to 1 and 0.05, respectively. Further, the relative magnetic permeability of the hollow cylindrical member 6 was set to 1.1 and the relative magnetic permeability of the spacers 36 was varied in range from 1.0 to 10,000. The results of this simulation were as shown in FIG. 25. As seen from FIG. 25, the magnetic-flux density increased with the relative magnetic permeability, as indicated by the curve. To demonstrate how the magnetic-flux density changed at relative magnetic permeability of about 1.0, a part of the curve is magnified in FIG. 26. As is evident from FIG. 26, the magnetic-flux density increased in proportion to the relative magnetic permeability, and the rate at which the magnetic-flux density increased was 1 when the relative magnetic permeability of the spacers 36 was 1.4, more or less. If the spacers 36 have relative magnetic permeability of 1.5 or more, the intensity of the effective magnetic flux intersecting with the armature coil 12 can be increased to 1.0 or more, or practically increased, as can be understood from FIG. 25.

In this embodiment, a spacer having a relatively high relative magnetic permeability is interposed between the same poles of any two adjacent ones of the magnet units 38 that are arranged in a row, forming a field yoke. Therefore, the linear motor according to this embodiment is easy to assemble. Since the spacers are interposed between the magnet units, fewer permanent magnets can constitute a magnet row of the same length. Despite the use of fewer permanent magnets, the effective magnetic flux can be efficiently applied to the armature coil through the spacers. This increases the motor thrust, providing a linear motor that can move at high speed.

Furthermore, since the hollow cylindrical member having a relative magnetic permeability ranging from 1.0 to 2.0 or less wraps and seals the magnet units, neither the permanent magnets nor the spacers having high relative magnetic permeability contact water or are oxidized. This helps to provide a linear motor that excels in durability.

It should be noted that the present invention is not limited to the various embodiments described above. The components of any embodiment can be modified in various manners in reducing the invention to practice, without departing from the spirit or scope of the invention. Further, the components of the embodiments described above may be combined, if necessary, in appropriate ways, thereby to make different inventions. Still further, some of the component of any embodiment may not be used. Moreover, the components of the different embodiments may be combined in any desired fashion.

What is claimed is:
1. A linear motor comprising:
   a field yoke composed of a hollow cylindrical member made of material having relative magnetic permeability m (where m is greater than 1.0 and equal to or less than 2.0) and a plurality of permanent magnets arranged in a straight row, each with either pole facing and contacting the same pole of either adjacent permanent magnet;
an armature having an armature coil arranged, facing the row of magnets and spaced by a magnetic gap from the row of magnets;
magnetic characteristic-fluctuating parts arranged at ends of the row of magnets or at the middle thereof and configured to abruptly change magnetic characteristic of the row of magnets; and
a magnetic linear encoder using the row of magnets as magnetic scale unit, utilizing a distance between any two adjacent permanent magnets as scale pitch of the magnetic scale unit, and having a plurality of first magnetic detectors and a second magnetic detector, which are arranged in a lengthwise direction of the armature, the first magnetic detectors being so arranged to have a phase difference of 90° (corresponds to ¼ wavelength of the scale pitch) in terms of electrical degree with respect to each other, and the second magnetic detector being so arranged to have a phase difference of 180° (corresponds to ½ wavelength of the scale pitch) in terms of electrical degree with respect to the first magnetic detectors,
wherein one component selected form the group consisting of the field yoke and the armature is provided at the stator, and the other component is provided as a movable member, the magnetic linear encoder has a scale head provided at the armature, and the field yoke and the armature move straight relative to each other.

2. A linear motor comprising:
a field yoke composed of a hollow cylindrical member and a plurality of permanent magnet units arranged in a straight row, each with either pole contacting the different pole of either adjacent magnet unit, and each magnet unit composed of two permanent magnets magnetized in the same direction and a spacer having prescribed thickness and interposed between the two permanent magnets, each permanent magnet having either pole facing the same pole of the other permanent magnet;
an armature having an armature coil arranged, facing the row of magnet units and spaced by a magnetic gap from the row of magnet units;
magnetic characteristic-fluctuating parts arranged at ends of the row of magnet units or at the middle thereof and configured to abruptly change magnetic characteristic of the row of magnet units; and
a magnetic linear encoder using the row of magnet units as magnetic scale unit, utilizing a distance between any two adjacent magnet units as scale pitch of the magnetic scale unit, and having a plurality of first magnetism detectors and a second magnetism detector, which are arranged in a lengthwise direction of the armature, the first magnetism detectors being so arranged to have a phase difference of 90° (corresponds to ¼ wavelength of the scale pitch) in terms of electrical degree with respect to each other, and the second magnetism detector being so arranged to have a phase difference of 180° (corresponds to ½ wavelength of the scale pitch) in terms of electrical degree with respect to the first magnetism detectors,
wherein one component selected form the group consisting of the field yoke and the armature is provided at the stator, and the other component is provided as a movable member, the magnetic linear encoder has a scale head provided at the armature, and the field yoke and the armature move straight relative to each other.

3. The linear motor according to claim 2, wherein a ratio D/L of the outer diameter D of each permanent magnet to the sum L of the length of each permanent magnet as measured in magnetized direction and the thickness of each spacer is at least 0.3.

4. The linear motor according to claim 2, wherein a ratio t/L of the length t of each magnet material to the sum L of the length of each permanent magnet as measured in magnetized direction and the thickness of each spacer ranges from 0.005 to 0.5.

5. The linear motor according to claim 2, wherein the hollow cylindrical member is made of material having relative magnetic permeability m, where m is greater than 1.0 and equal to or less than 2.0.

6. The linear motor according to claim 4, wherein the hollow cylindrical member is made of material having relative magnetic permeability m, where m is greater than 1.0 and equal to or less than 2.0.

7. The linear motor according to claim 2, wherein the spacer has thickness larger than a wall thickness of the hollow cylindrical member.

8. The linear motor according to claim 4, wherein the spacer has thickness larger than a wall thickness of the hollow cylindrical member.

9. The linear motor according to claim 2, wherein the spacer has relative magnetic permeability n higher by at least 0.5 than relative magnetic permeability m of the hollow cylindrical member.

10. The linear motor according to claim 7, wherein the spacer has relative magnetic permeability n of at least 1.5.

11. The linear motor according to claim 1 or 2, wherein the hollow cylindrical member is made of nonmagnetic stainless steel.

12. The linear motor according to claim 1 or 2, wherein the magnetic characteristic-fluctuating parts have a length larger than the length of the permanent magnets as measured in magnetized direction.

13. The linear motor according to claim 1 or 2, wherein the magnetic characteristic-fluctuating parts have relative magnetic permeability r of 2 at most.

14. The linear motor according to claim 13, wherein the magnetic characteristic-fluctuating parts are made of one nonmagnetic material selected from the group consisting of aluminium alloy, copper alloy and nonmagnetic stainless steel.

15. The linear motor according to claim 1 or 2, wherein the magnetic characteristic-fluctuating parts are made of magnetic material having relative magnetic permeability of at least 50.

16. The linear motor according to claim 1 or 2, wherein the magnetic characteristic-fluctuating parts are made of one nonmagnetic material selected from the group consisting of magnetic stainless steel, mild steel, silicon iron BFM, carbon steel, and low-carbon steel.

17. The linear motor according to claim 1 or 2, wherein the first magnetism detectors and the second magnetism detector are Hall elements.

18. The linear motor according to claim 1 or 2, wherein the permanent magnets are shaped like a column or a hollow cylinder.

19. The linear motor according to claim 1 or 2, wherein the permanent magnets are rare-earth magnets.

20. The linear motor according to claim 19, wherein the rare-earth magnets are neodymium-based ones.

* * * * *